(12) United States Patent
Otts

(10) Patent No.: US 8,271,224 B2
(45) Date of Patent: Sep. 18, 2012

(54) FUSING STRUCTURES FROM MULTI-SENSOR DATA

(75) Inventor: Daniel W. Otts, Allen, TX (US)

(73) Assignee: Raytheon Company, Waltham, MA (US)

(*) Notice: Subject to any disclaimer, the term of this patent is extended or adjusted under 35 U.S.C. 154(b) by 435 days.

(21) Appl. No.: 12/686,428

(22) Filed: Jan. 13, 2010

(65) Prior Publication Data

US 2011/0172971 A1    Jul. 14, 2011

(51) Int. Cl.
*G06F 19/00* (2011.01)
(52) U.S. Cl. ....................................................... 702/116
(58) Field of Classification Search .................. 702/116, 702/117, 118, 182–185, 188
See application file for complete search history.

(56) References Cited

U.S. PATENT DOCUMENTS

| | | | |
|---|---|---|---|
| 5,699,447 | A | 12/1997 | Alumot et al. |
| 5,982,921 | A | 11/1999 | Alumot et al. |
| 6,064,759 | A | 5/2000 | Buckley et al. |
| 6,178,257 | B1 | 1/2001 | Alumot et al. |
| 6,330,523 | B1 | 12/2001 | Kacyra et al. |
| 6,501,414 | B2 | 12/2002 | Arndt et al. |
| 6,952,491 | B2 | 10/2005 | Alumot et al. |
| 7,053,820 | B2 | 5/2006 | Goodman et al. |
| 7,062,417 | B2 | 6/2006 | Kruger et al. |
| 7,151,976 | B2 | 12/2006 | Lin |
| 7,307,575 | B2 | 12/2007 | Zemany |
| 7,499,583 | B2 | 3/2009 | Alumot et al. |
| 7,526,405 | B2 | 4/2009 | Miller et al. |
| 7,796,807 | B2 | 9/2010 | Alumot et al. |
| 2007/0241738 | A1 | 10/2007 | Baranauskas et al. |
| 2009/0033539 | A1 | 2/2009 | Zemany |
| 2009/0243916 | A1 | 10/2009 | Beeri et al. |
| 2009/0289830 | A1 | 11/2009 | Pergande et al. |
| 2009/0295618 | A1 | 12/2009 | Beeri et al. |
| 2010/0134285 | A1* | 6/2010 | Holmquist .................... 340/541 |

FOREIGN PATENT DOCUMENTS

EP        1 777 550 A1    4/2007

OTHER PUBLICATIONS

U.S. Appl. No. 12/683,924 entitled "Designating Corridors to Provide Estimates of Structures", by Daniel W. Otis, 24 pages, Filed Jan. 7, 2010.
Wenxia, Shi, et al. "Investigating the Performance of Corridor and Door Detection Algorithms in Different Environments", Information and Automation, 2006, ICIA 2006. International Conference on, IEEE, Dec. 1, 2006 pp. 206-211.

(Continued)

*Primary Examiner* — Edward Raymond
(74) *Attorney, Agent, or Firm* — Cantor Colburn LLP

(57) ABSTRACT

In particular embodiments, fusing structures includes receiving sensor data sets generated by sensors in response to sensing a structure system. Each sensor data set describes structures of the structure system. Structure pairs are generated, where a structure pair comprises a first structure from a first sensor data set and a second structure from a second sensor data set. A relational vector set is defined for each structure pair, and a relational vector score is calculated for each structure pair according to the relational vector set of the structure pair. An association score is calculated for each structure pair according to the relational vector score of the structure pair. The association score of the structure pair indicates a likelihood that the structure pair is fusable.

22 Claims, 4 Drawing Sheets

OTHER PUBLICATIONS

Holland, John, "Designing Autonomous Mobile Robots: Inside the Mind of an Intelligent Machine", Dec. 29, 2003, Newness, pp. 1-352.

Newman, P., et al., "Outdoor SLAM using visual appearance and laser ranging" Robotics and Automation, 2006, ICRA 2006 Proceedings 2006 IEEE International Conference at Orlando, Fl. May 15-19, 2006 IEEE, May 15, 2006, pp. 1180-1187.

Siagian, C., et al., "Biologically Inspired Mobile Robot Vision Localization", IEEE Service Center, vol. 25, No. 4, Aug. 1, 2009, pp. 861-873.

Stilla, U. et al., "Potential and limits of InSAR data for building reconstruction in built-up areas" ISPRS Journal of Photogrammetry and Remote Sensing, vol. 58, No. 1-2, Jun. 1, 2003, pp. 113-123.

Nerino, R., "Automatic registration of point-based surfaces", WSEAS Transactions on Computers World Scientific and Engineering Academy and Society, vol. 5, No. 12, Dec. 1, 2006 pp. 2984-2991.

Notification of Transmittal of the International Search Report and the Written Opinion of the International Search Authority, or the Declaration, PCT/US2011/020064 dated Mar. 16, 2011, 13 pages.

Leavers, V. F., ed., "Shape Detection in Computer Vision Using the Hough Transform", Towards a Representation of Shape, XP007914240, ISBN: 978-3-540-19723-2, pp. 88-107, Jan. 1, 1992.

Tat Soon Yeo, et al., "A New Subaperture Approach to High Squint SAR Processing", IEEE Transactions on Geoscience and Remote Sensing, vol. 39, No. 5, XP011021759A, ISSN: 0196-2892, pp. 954-968, May 1, 2001.

Bin Luo, et al., "Graph Spectral Approach for Learning View Structure", 16th International Conference on Pattern Recognition (ICPR '02), vol. 3, XP010613741A, ISBN: 978-0-7695-1695-0, pp. 785-788, Aug. 11, 2002.

Ma Yi et al., "An invitation to 3-D Vision, Representation of a Three-Dimensional Moving Scene, Quaternions and Euler Angles for Rotations", Springer Verlag, Berlin, XP007914241, ISBN: 978-0-387-00893-6, pp. 390-403, Jan. 1, 2004.

Zhiguang Zhong, et al., "Pose Estimation and Structure Recovery from Point Pairs", Proceedings of the 2005 IEEE International Conference on Robotics and Automation, Barcelona, Spain, XP010872265A, ISBN: 978-0-7803-8914-4, pp. 442-447, Apr. 18, 2005.

Zhiguang, Zhong, et al., "Effective pose estimation from point pairs", Image and Vision Computing, Elsevier, vol. 23, No. 7, XP004921786, ISSN: 0262-8856, pp. 651-660, Jul. 1, 2005.

Roberto Nerino, "Automatic registration of point-based surfaces", WSEAS Transactions on Computers, Issue 12, vol. 5, ISSN: 1109-2750, XP8125025A, pp. 2984-2991, Dec. 1, 2006.

Dr. Christophe Gouinaud, "SAR Image Fusion in Multi Sensor Context for Small Urban Area Detection", IGARSS, IEEE, XP031422669, ISBN: 978-'-4244-2807-6, pp. III-988 thru III-991, Jul. 7, 2008.

PCT, Notification of Transmittal of the International Search Report and the Written Opinion of the International Searching Authority, or the Declaration, International Application No. PCT/US2010/031824, 16 pages, Aug. 12, 2010.

Patent Application entitled "Fusing Multi-Sensor Data to Provide Estimates of Structures," U.S. Appl. No. 12/427,474, 27 pages specification, claims, and abstract, 8 pages of drawings, inventors Benjamin M. Howe et al., Apr. 21, 2009.

Patent Application entitled "Fusing Multi-Sensor Data Sets According to Relative Geometrical Relationship," 31 pages specification, claims, and abstract, 5 pages of drawings, inventor Daniel W. Otts, Jan. 13, 2010.

USPTO Office Action, U.S. Appl. No. 12/427,474 to Benjamin H. Howe; 11 pages, dated Mar. 28, 2011.

Jean-Philippe Thirion, "New Feature Points based on Geometric Invariants for 3D Image Registration", International Journal of Computer Vision, vol. 18, No. 2, pp. 121-137, May 1, 1996.

Roberto Nerino, "Invariant features for automatic coarse registration of point-based surfaces", Proc. of the 6th WSEAS Int. Conf. on Signal Processing, Computational Geometry & Artificial Vision, Elounda, Greece, XP-002634722, pp. 10-15, Aug. 21-23, 2006.

Marinella Cadoni, et al., "3D Face Recognition Using Joint Differential Invariants", Advances in Biometrics, Springer Berlin Heidelberg, Berlin, Heidelberg, XP019117937, pp. 279-288, Jun. 2, 2009.

PCT Notification of Transmittal of the International Search Report and the Written Opinion of the International Searching Authority, or the Declaration, International Application No. PCT/US2011/020726, 13 pages, May 10, 2011.

Kruskal, J.B., "Multidimensional Scaling by Optimizing Goodness of Fit to a Nonmetric Hypothesis", Psychometrika, vol. 29, No. 1, XP008130844, 27 pages, Mar. 1, 1964.

Lee, Sang-Chul, et al., "Multisensor Raster and Vector Data Fusion Based on Uncertainty Modeling", 2004 International Conference on Image Processing (ICIP), IEEE, pp. 3355-3358, Oct. 2004.

PCT, Notification of Transmittal of the International Search Report and the Written Opinion of the International Searching Authority, or the Declaration, International Application No. PCT/US2010/053095, 14 pages, Mar. 9, 2011.

\* cited by examiner

FUSING STRUCTURES FROM MULTI-SENSOR DATA

GOVERNMENT FUNDING

The U.S. Government may have certain rights in this invention as provided for by the terms of Contract No. W15P7T-08-C-P203 awarded by the Defense Advanced Research Projects Agency.

TECHNICAL FIELD

This invention relates generally to the field of sensor data analysis and more specifically to fusing structures from multi-sensor data.

BACKGROUND

Enforcement, security, and military forces may perform operations in structure systems such as buildings. Multiple sensors may be used to determine the layout of the structure system. In certain situations, however, fusing the data from multiple sensors may be difficult.

SUMMARY OF THE DISCLOSURE

In accordance with the present invention, disadvantages and problems associated with previous techniques for fusing multi-sensor data may be reduced or eliminated.

In particular embodiments, fusing structures includes receiving sensor data sets generated by sensors in response to sensing a structure system. Each sensor data set describes structures of the structure system. Structure pairs are generated, where a structure pair comprises a first structure from a first sensor data set and a second structure from a second sensor data set. A relational vector set is defined for each structure pair, and a relational vector score is calculated for each structure pair according to the relational vector set of the structure pair. An association score is calculated for each structure pair according to the relational vector score of the structure pair. The association score of the structure pair indicates a likelihood that the structure pair is fusable.

Certain embodiments of the invention may provide one or more technical advantages. A technical advantage of one embodiment may be that structure pairs that include a first structure from a first sensor and a second structure from a second sensor may be evaluated to determine if the first and second structures represent the same physical structure. Structures that represent the same physical structure may be fused.

Another technical advantage of one embodiment may be that a slope test may be performed on a structure pair to determine a slope test score that indicates the likelihood that structures represent the same physical structure. Another technical advantage of one embodiment may be that a relational vector set may be defined for a structure pair to determine a relational vector score that indicates the likelihood that structures represent the same physical structure. Another technical advantage of one embodiment may be that an association score that indicates the likelihood that structures represent the same physical structure may be calculated from the slope test score and/or the relational vector score.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
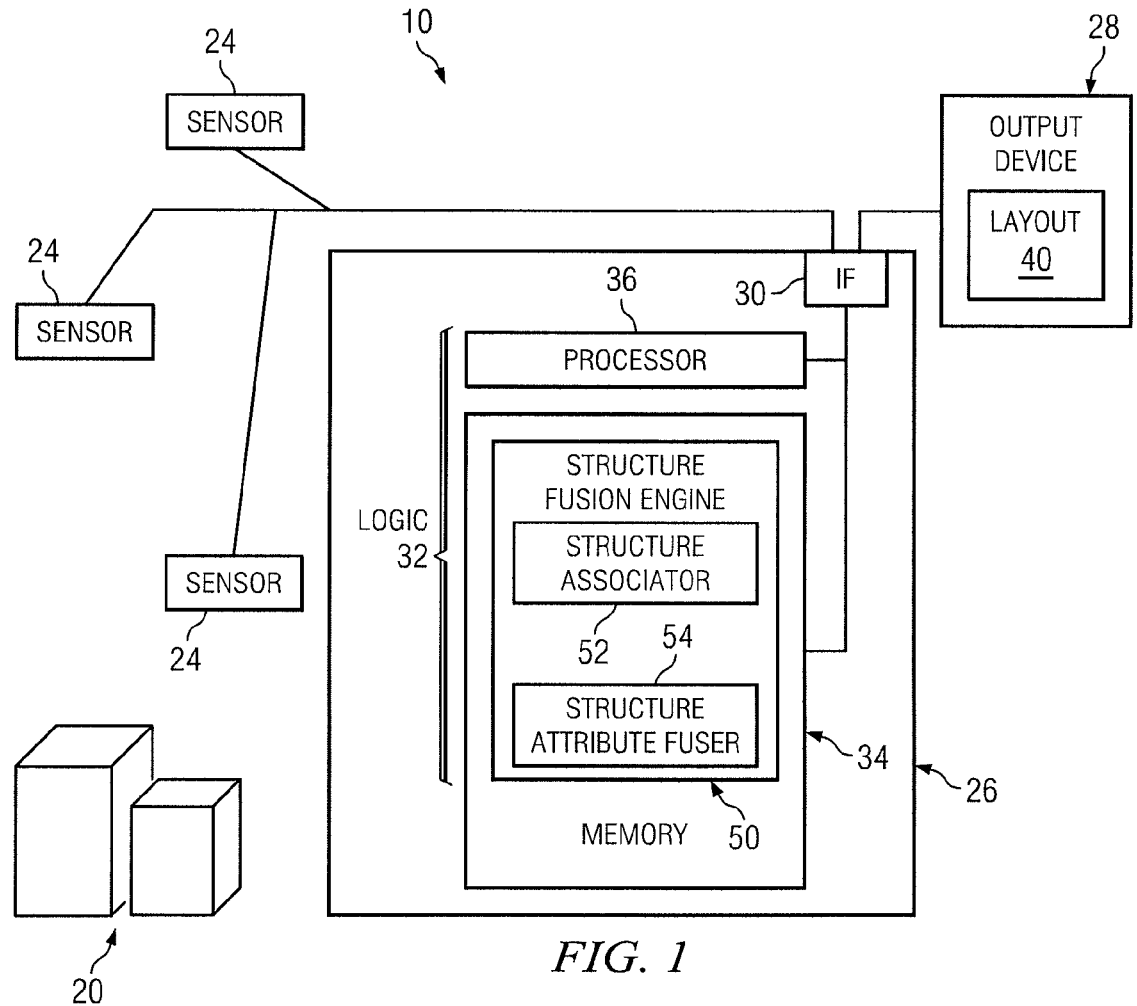
FIG. 1 illustrates one embodiment of a system configured to fuse structures from multi-sensor data.

FIG. 1 illustrates one embodiment of a system 10 configured to fuse structures from multi-sensor data. In certain embodiments, system 10 evaluates structure pairs that include a first structure from a first sensor and a second structure from a second sensor to determine if the first and second structures represent the same physical structure. Structures that represent the same physical structure may be fused. In the embodiments, system 10 may perform a slope test to determine a slope test score that indicates the likelihood that structures represent the same physical structure. System 10 may define a relational vector set to determine a relational vector score that indicates the likelihood that structures represent the same physical structure. System 10 may calculate an association score that indicates the likelihood that structures represent the same physical structure may be calculated from the slope test score and/or the relational vector score.

In the illustrated embodiment, system 10 includes sensors 24, a computing system 26, and an output device 28. Computing system 26 includes an interface (IF) 30, logic 32, and memory 34. Logic 32 includes a processor 36 and applications such as a structure fusion engine 50, which includes a structure associator 52 and a structure attribute fuser 54. Output device 28 displays a layout 40.

In the illustrated embodiment, structure systems 20 may be one or more natural and/or manmade physical objects. Examples of structure systems 20 include buildings such as military, corporate, residential, academic, or medical buildings. In certain embodiments, a structure system 20 may have internal structures that are not visible outside of structure system 20. For example, a building may have rooms bordered by walls such that the rooms are not visible outside of the building. Other structures include walls of a room and corners of a room where two walls meet. The layout of the structure system, such as the floor plan of a building, may describe at least some of these internal structures.

Sensors 24 may generate sensor data sets in response to sensing one or more structure systems 20. Sensor 24 may be any suitable sensing device. Examples of sensors include radar sensors, video cameras, camcorders, closed-circuit television cameras, digital cameras, surveillance cameras, infrared cameras, x-ray cameras, and/or satellite cameras. In certain embodiments, more than one sensor 24 may send data to computing system 26.

The sensor data sets include sensor data that describes the structures of the structure systems. The sensor data may be said to include structures that represent physical structures. For example, a line may represent a physical wall, and an n-hedral may represent a physical corner. An n-hedral is a set of n lines with a common point, where n is an integer.

The sensor data may describe the location and/or orientation of physical structures. For example, the sensor data may include a line with a position and/or slope that describes the location and/or orientation of a wall. In certain embodiments, a structure of sensor data may be associated with a confidence that indicates the accuracy of the description of the structure. The confidence may be determined in any suitable manner, for example, by the wall intensity scaled by wall length.

Computing system 26 includes an interface 30 that receives input, sends output, processes the input and/or output, and/or performs other suitable operation. Interface 30 may comprise hardware and/or software.

Logic 32 performs the operations of the component, for example, executes instructions to generate output from input. Structure fusion engine 50 of logic 32 receives sensor data sets from sensors 24 sensing structure systems 20 and generates layout 40 of structure systems 20. In certain embodiments, structure fusion engine 50 includes structure associator 52 and structure attribute fuser 54.

Structure associator 52 identifies structures of different sensor data sets that may represent the same physical feature. In certain embodiments, structure associator 52 receives sensor data sets generated by sensors 24 in response to sensing one or more structure systems 20. A first sensor data set may be generated by a first sensor, and a second sensor data set may be generated by a second sensor distinct from the first sensor. Each sensor data set describes structures of structure systems 20. Structure associator 52 generates structure pairs, where a structure pair comprises a first structure from the first sensor data set and a second structure from the second sensor data set.

In the embodiments, structure associator 52 defines a relational vector set for each structure pair. The relational vector set comprises vectors from first points (that is, vector origins) of the first structure to one or more second points of the second structure, where each vector is the shortest vector from a first point to a second point. In certain examples, the first structure may be shorter than or equal to the second structure. Structure associator 52 calculates a relational vector score for each structure pair from the relational vector set of the structure pair. Structure associator 52 calculates an association score for each structure pair using the relational vector score of the structure pair. The association score of the structure pair indicates a likelihood that the structure pair is a fusable structure pair, where a fusable structure pair comprises first and second structures representing the same physical structure.

Structure associator 52 identifies structure pairs to fuse according to the association scores of the structure pairs. A higher likelihood that a structure pair is fusable may be indicated by a higher or lower score (for example, a slope test, relational vector, or association score). In certain embodiments, a lower score may be a cost that indicates a higher likelihood. In the embodiments, structure associator 52 may identify fusable structure pairs as pairs with association scores that are less than a threshold.

Structure attribute fuser 54 fuses structure pairs identified by structure associator 52. In certain embodiments, structure attribute fuser 54 generates a layout of structures systems 20 from the fused structure pairs. A method that structure fusion engine 50 may use is described in more detail with respect to FIG. 2.

Logic 32 may include hardware, software, and/or other logic. Logic 32 may be encoded in one or more tangible media and may perform operations when executed by a computer. Certain logic 32, such as processor 36, may manage the operation of a component. Examples of a processor 36 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 34 stores applications such as structure fusion engine 50. Memory 34 may comprise one or more tangible, computer-readable, and/or computer-executable storage medium. Examples of memory 34 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Output device 28 outputs layout 40 generated by computing system 26. Output device may provide layout 40 in any suitable manner, for example, as a visual display, a printed hard copy, or an audio file. Examples of output device 28 includes a computer display, a printer, or a speaker. The layout of a room may be provided in two dimensions (2D) or three dimensions (3D). A wall, or "plate," may be represented by either a line in a two-dimensional layout or a plane in a three-dimensional layout. A corner may be represented by a type of n-hedral. The common point may be called the "corner point." A corner may be represented by a dihedral, or 2-hedral, in a two-dimensional layout or a trihedral, or 3-hedral, in a three-dimensional layout.

Figure 2:
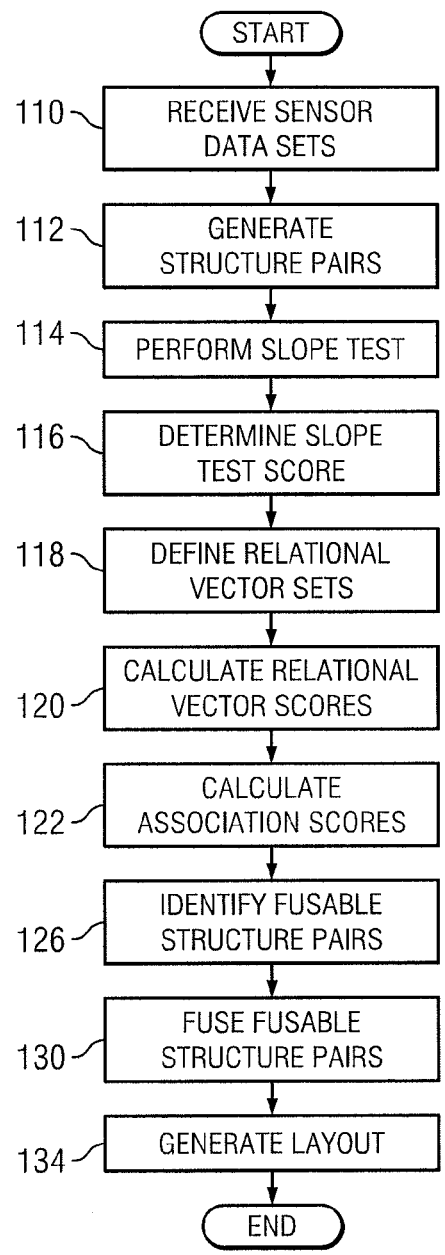
FIG. 2 illustrates an example of a method for fusing structures from multi-sensor data.

FIG. 2 illustrates an example of a method for fusing structures from multi-sensor data. The method may be performed by system 10 of FIG. 1. In the example, a higher likelihood that a structure pair is fusable may be indicated by a lower score, or cost.

In certain embodiments, sensor data sets that include sensor data are received at step 110. A first sensor data set may be generated by a first sensor 24, and a second sensor data set may be generated by a second sensor 24. The sensor data may be generated in response to sensing structure systems 20 and may describe structures of structure systems 20.

Figure 3:
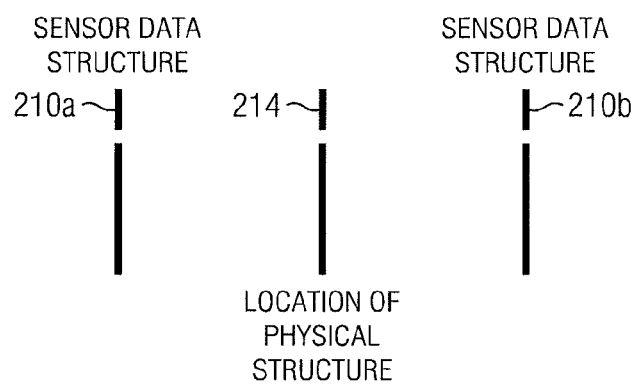
FIG. 3 illustrates examples of structures.

Structure pairs are generated at step 112. FIG. 3 illustrates examples of structures. A structure pair may comprise a first structure 210a from the first sensor data set and a second structure 210b from the second sensor data set. For example, a structure pair may comprise a first line from the first sensor data set and a second line from the second sensor data set, where lines represent walls. If structures 210 (210a,b) represent a physical structure 214, then the position and/or slope of lines may provide an estimate of the location and/or orientation of physical structure 214.

The slope test is performed to yield a slope test score at step 114. The slope test measures the angle between structures 210 of a structure pair. The slope test score may indicate a likelihood that the structure pair represents the same physical object and is a fusable structure pair.

Figure 4:
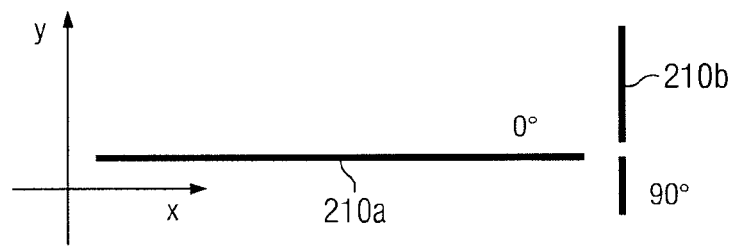
FIG. 4 illustrates an example of a slope test.

The slope test may be performed in any suitable manner. FIG. 4 illustrates an example of a slope test. The angle between structures 210 of a structure pair may be measured in any suitable manner. In certain embodiments, a first slope of first structure 210a of the structure pair is determined, and a second slope of second structure 210b of the structure pair is determined. A difference between the first slope and a second slope is calculated. In other embodiments, the angle between first structure 210a and second structure 210b may be directly measured. In the illustrated example, the angle between structures 210a and 210b is 90 degrees.

A slope test score is determined at step 116. The slope test score may be determined in any suitable manner, such as according to the angle between structures. The angle may indicate that structures 210 represent the same physical structure 214. For example, an angle of approximately zero degrees may indicate this. "Approximately x degrees" may be described as x±a threshold of any suitable value, such a value in the range of 0 to 2, 2 to 5, or 5 to 10 degrees. "Approximately zero degrees" may be described as 0±a threshold, or angles with a magnitude less than a threshold. In the example, angles that are "approximately zero degrees" may be angles with a magnitude less than a slope threshold. In certain embodiments, an angle magnitude less than the threshold may indicate good fusion candidates, which may be given a minimum slope test score such as zero. An angle magnitude greater than the threshold may indicate poor fusion candidates, which may be given a maximum slope score.

Referring back to FIG. 1, relational vector sets are defined for structure pairs at step 118. A relational vector set may be defined for each structure pair. A relational vector set comprises vectors from first points of the first structure 210a to one or more second points of the second structure 210b. The first structure 210a may be shorter than or equal to the second structure 210b. Each vector is the shortest vector from a first point to a second point. The relational vector sets may be defined in any suitable manner.

Figure 5A:
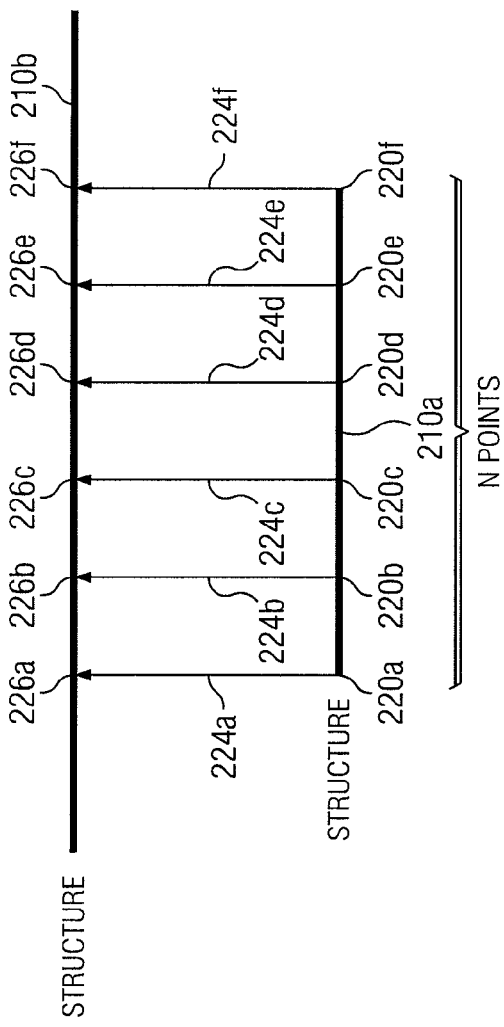
FIGS. 5A and 5B illustrate examples of defining relational vector sets.
Figure 5B:
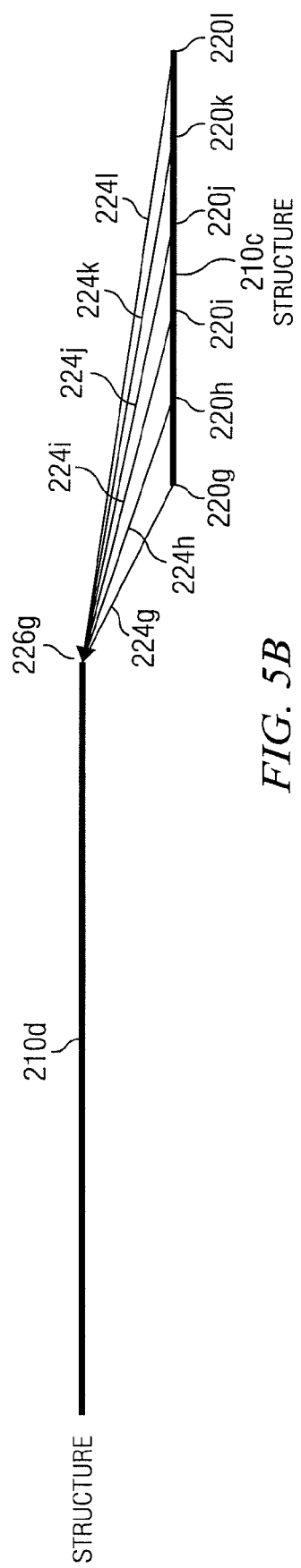

FIGS. 5A and 5B illustrate examples of defining relational vector sets. In certain embodiments, structures 210 may be sorted according to length in order to select a first structure 210a that is shorter than or equal to a second structure 210b. In the examples, N first points 220 (220a-f) are defined along first structure 210a, and N first points 220 (220g-l) are defined along first structure 210c. N may have any suitable value, such as a value in the range of 2 to 5, 5 to 10, or greater than 10. First points 220 may be equally spaced along the first structure 210a.

For each first point 220 (220a-l), a vector 224 (224a-l) is generated from the point 220 to a point 226 (226a-l) of the second structure. The vector 224 may be the shortest vector 224 from first point 220 to the second point 226 closest to the first point 220. In the example, vector 224x is the shortest vector from the point 220x to a point 226x, where x=a, b, . . . l. In FIG. 5A, vectors 224(a-f) point to different points 226 (a-f). In FIG. 5B, vectors 224(g-l) point to the same point 226g. Accordingly, structures 210a and 210b may be more aligned and more likely to represent the same physical structure than structures 210c and 210d.

Referring back to FIG. 1, relational vector scores are calculated from the relational vector set at step 122. The relational vector scores may be calculated in any suitable manner. In certain embodiments, a relational vector score may be calculated from a vector magnitude score and/or a vector angle score.

The vector magnitude score may be calculated in any suitable manner. In certain embodiments, a vector magnitude score may be calculated from a mathematical function applied to the magnitudes of the vectors. For example, the vector magnitude score may be calculated from a root-sum-square of the vectors.

The vector angle score may be calculated in any suitable manner. In certain embodiments, vector angle score may be calculated from a mathematical function applied to a plurality of angles, where an angle is between a vector and a slope of the second structure. A statistical measure (such an average) of the angles may be calculated. The vector angle score may be determined according to the average. For example, if the average is approximately zero or approximately ninety degrees, a vector angle score that indicates a higher likelihood that the structure pair is a fusable structure pair may be determined. Otherwise, a vector angle score that indicates a lower likelihood may be determined.

The relational vector score may be calculated according to the vector magnitude score and/or the vector angle score in any suitable manner. In certain embodiments, a relational vector score may be calculated from a mathematical function applied to the vector magnitude score and the vector angle score. For example, the relational vector score may be the sum of the vector magnitude score and the vector angle score.

Referring back to FIG. 1, association scores are calculated at step 122. The association score of a structure pair may indicate a likelihood that the structure pair is a fusable structure pair, where a fusable structure pair represents the same physical structure. The association score may be calculated in any suitable manner. In certain embodiments, the association score may be calculated by applying a mathematical function to the relational vector score and/or slope test score of the structure pair. For example, the association score may be the sum of the relational vector score and the slope test score.

Fusable structure pairs are identified according to the association scores of the structure pairs at step 126. Fusable structure pairs may be structure pairs that likely represent the same physical structure and that can be fused. The pairs may be identified in any suitable manner. In certain embodiments, the association scores along with confidence values are placed in an association matrix. Starting form higher confidence to lower confidence, association scores that meet an association score threshold are selected. The association score threshold may have any suitable value, and may be selected according to widths of typical structures. For example, if the width of a typical hallway is a minimum of 1.2 meters, the threshold may be selected as one meter. The structures of the structure pairs associated with the selected association scores are fused.

Figure 6:
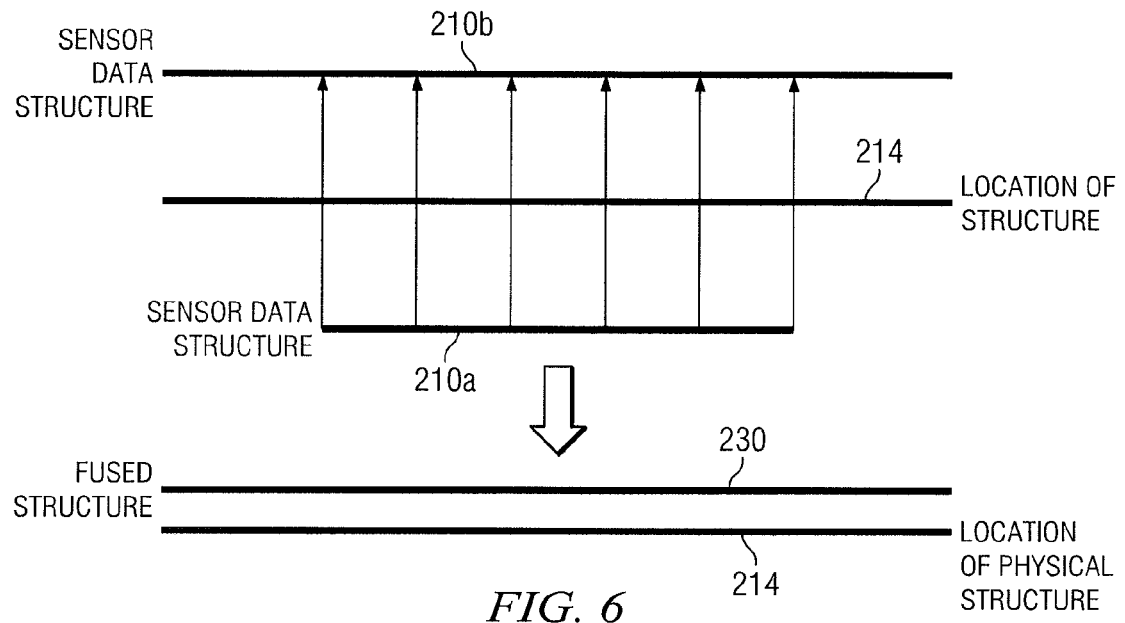
FIG. 6 illustrates an example of fusing structures.

Fusable structure pairs are fused at step 130. The structure pairs may be fused in any suitable manner. FIG. 6 illustrates an example of fusing structures. In the example, structure 210a is fused with structure 210a to yield fused structure 230, which provides an estimate of physical structure 214. In certain embodiments, structures 210 may be fused by applying a mathematical function (such as an average or weighted average) to structures 210. For example, the function may be applied to the length, position, and/or slope of the structures to yield an average length, position, and/or slope, which may be used as the length, position, and/or slope of the fused structure 230.

Figure 7:
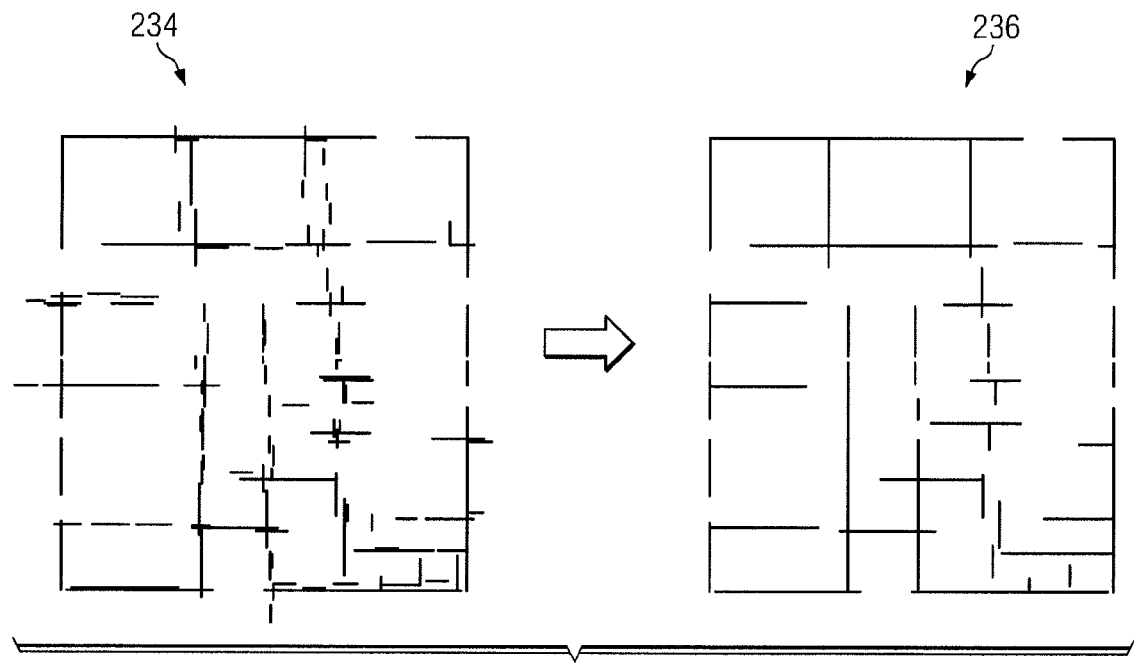
FIG. 7 illustrates an example of generating a layout.

Referring back to FIG. 1, layout 40 of structures systems 20 is generated at step 134 from the fused structure pairs. Layout 40 may be generated in any suitable manner. FIG. 7 illustrates an example of generating layout 40. Layout 234 includes unfused structures, and layout 236 includes fused structures. Referring back to FIG. 1, the method ends.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. For example, the operations of structure fusion engine 50 may be performed by more than one component. As used in this document, "each" refers to each member of a set or each member of a subset of a set.

Modifications, additions, or omissions may be made to the methods described herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
receiving a plurality of sensor data sets generated by a plurality of sensors in response to sensing one or more structure systems, a first sensor data set generated by a first sensor, a second sensor data set generated by a second sensor, each sensor data set describing a plurality of structures of the structure systems;
generating a plurality of structure pairs, a structure pair comprising a first structure from the first sensor data set and a second structure from the second sensor data set;
defining a relational vector set for each structure pair, the relational vector set comprising a plurality of vectors from a plurality of first points of the first structure to one or more second points of the second structure, each relational vector being the shortest vector from a first point to a second point;
calculating a relational vector score for each structure pair according to the relational vector set of the structure pair; and
calculating an association score for each structure pair according to the relational vector score of the structure pair, the association score of the structure pair indicating a likelihood that the structure pair is fusable.

2. The method of claim 1, further comprising:
identifying one or more structure pairs to fuse according to the association scores of the structure pairs.

3. The method of claim 1:
further comprising:
determining a slope test score for each structure pair, the slope test score indicating a likelihood that the structure pair is fusable; and
the calculating an association score further comprising:
calculating an association score for each structure pair according the relational vector score and the slope test score of the structure pair.

4. The method of claim 1, further comprising performing a slope test for each structure pair by:
determining a first slope of the first structure of the structure pair;
determining a second slope of the second structure of the structure pair;
calculating a difference between the first slope and a second sloped; and
calculating a slope test score according to the difference, the slope test score indicating a likelihood that the structure pair is fusable.

5. The method of claim 1, the defining a relational vector set for each structure pair further comprising:
defining a plurality of equally spaced first points along the first structure; and
generating a shortest vector from each first point to a point of the second structure closest to the first point.

6. The method of claim 1, the calculating a relational vector score for each structure pair further comprising:
calculating a vector magnitude score from a plurality of magnitudes of the vectors;
calculating a vector angle score from a plurality of angles, an angle between a vector and a slope of the second structure; and
calculating the relational vector score according to the vector magnitude score and the vector angle score.

7. The method of claim 1, the calculating a relational vector score for each structure pair further comprising:
calculating a vector magnitude score from a root-sum-square of the vectors.

8. The method of claim 7, further comprising identifying one or more structure pairs to fuse according to the association scores of the structure pairs by:
starting from higher confidence to lower confidence, selecting one or more association scores that satisfy an association score threshold; and
identifying the one or more structure pairs associated with the one or more selected association scores to fuse.

9. The method of claim 1, the calculating a relational vector score for each structure pair further comprising:
calculating a plurality of angles between the vectors and a slope of the second structure;
calculating an average of the plurality of angles; and
determining a vector angle score that indicates a likelihood that the structure pair is fusable according to the average.

10. The method of claim 9, the determining a vector angle score further comprising:
if the average is approximately zero or ninety degrees, determining a vector angle score that indicates a higher likelihood that the structure pair is fusable; and
otherwise, determining a vector angle score that indicates a lower likelihood that the structure pair is fusable.

11. The method of claim 1, the first structure shorter than or equal to the second structure.

12. One or more non-transitory computer readable media storing logic, the logic when executed by a processor configured to: receive a plurality of sensor data sets generated by a plurality of sensors in response to sensing one or more structure systems, a first sensor data set generated by a first sensor, a second sensor data set generated by a second sensor, each sensor data set describing a plurality of structures of the structure systems; generate a plurality of structure pairs, a structure pair comprising a first structure from the first sensor data set and a second structure from the second sensor data set; define a relational vector set for each structure pair, the relational vector set comprising a plurality of vectors from a plurality of first points of the first structure to one or more second points of the second structure, each relational vector being the shortest vector from a first point to a second point; calculate a relational vector score for each structure pair according to the relational vector set of the structure pair; and calculate an association score for each structure pair according to the relational vector score of the structure pair, the association score of the structure pair indicating a likelihood that the structure pair is fusable.

13. The non-transitory computer readable media of claim 12, the logic further configured to: identify one or more structure pairs to fuse according to the association scores of the structure pairs.

14. The non-transitory computer readable media of claim 12, the logic further configured to identify one or more structure pairs to fuse according to the association scores of the structure pairs by: starting from higher confidence to lower confidence, selecting one or more association scores that satisfy an association score threshold; and identifying the one or more structure pairs associated with the one or more selected association scores to fuse.

15. The non-transitory computer readable media of claim 12, the logic further configured to: determine a slope test score for each structure pair, the slope test score indicating a likelihood that the structure pair is fusable; and calculate an association score by: calculating an association score for each structure pair according the relational vector score and the slope test score of the structure pair.

16. The non-transitory computer readable media of claim 12, the logic further configured to perform a slope test for each structure pair by: determining a first slope of the first structure of the structure pair; determining a second slope of the second structure of the structure pair; calculating a difference between the first slope and a second sloped; and calculating a slope test score according to the difference, the slope test score indicating a likelihood that the structure pair is fusable.

17. The non-transitory computer readable media of claim 12, the logic further configured to define a relational vector set for each structure pair by: defining a plurality of equally spaced first points along the first structure; and generating a shortest vector from each first point to a point of the second structure closest to the first point.

18. The non-transitory computer readable media of claim 12, the logic further configured to calculate a relational vector score for each structure pair by: calculating a vector magnitude score from a plurality of magnitudes of the vectors; calculating a vector angle score from a plurality of angles, an angle between a vector and a slope of the second structure; and calculating the relational vector score according to the vector magnitude score and the vector angle score.

19. The non-transitory computer readable media of claim 12, the logic further configured to calculate a relational vector score for each structure pair by: calculating a vector magnitude score from a root-sum-square of the vectors.

20. The non-transitory computer readable media of claim 12, the logic further configured to calculate a relational vector score for each structure pair by: calculating a plurality of angles between the vectors and a slope of the second structure; calculating an average of the plurality of angles; and determining a vector angle score that indicates a likelihood that the structure pair is fusable according to the average.

21. The non-transitory computer readable media of claim 20, the logic further configured to determine a vector angle score by: if the average is approximately zero or ninety degrees, determining a vector angle score that indicates a higher likelihood that the structure pair is fusable; and otherwise, determining a vector angle score that indicates a lower likelihood that the structure pair is fusable.

22. The non-transitory computer readable media of claim 12, the first structure shorter than or equal to the second structure.

\* \* \* \* \*